INVENTOR
M. S. SCHOEFFLER
BY E. W. Adams, Jr.
ATTORNEY

United States Patent Office 3,280,274
Patented Oct. 18, 1966

3,280,274
ECHO SUPPRESSOR FOR COMMUNICATION SYSTEMS HAVING EXTENDED TRANSMISSION DELAYS

Max S. Schoeffler, Morris Township, Morris County, N.J., assignor to Bell Telephone Laboratories, Incorporated, New York, N.Y., a corporation of New York Filed Oct. 30, 1963, Ser. No. 320,150
6 Claims. (Cl. 179—170.2)

Figure 1:
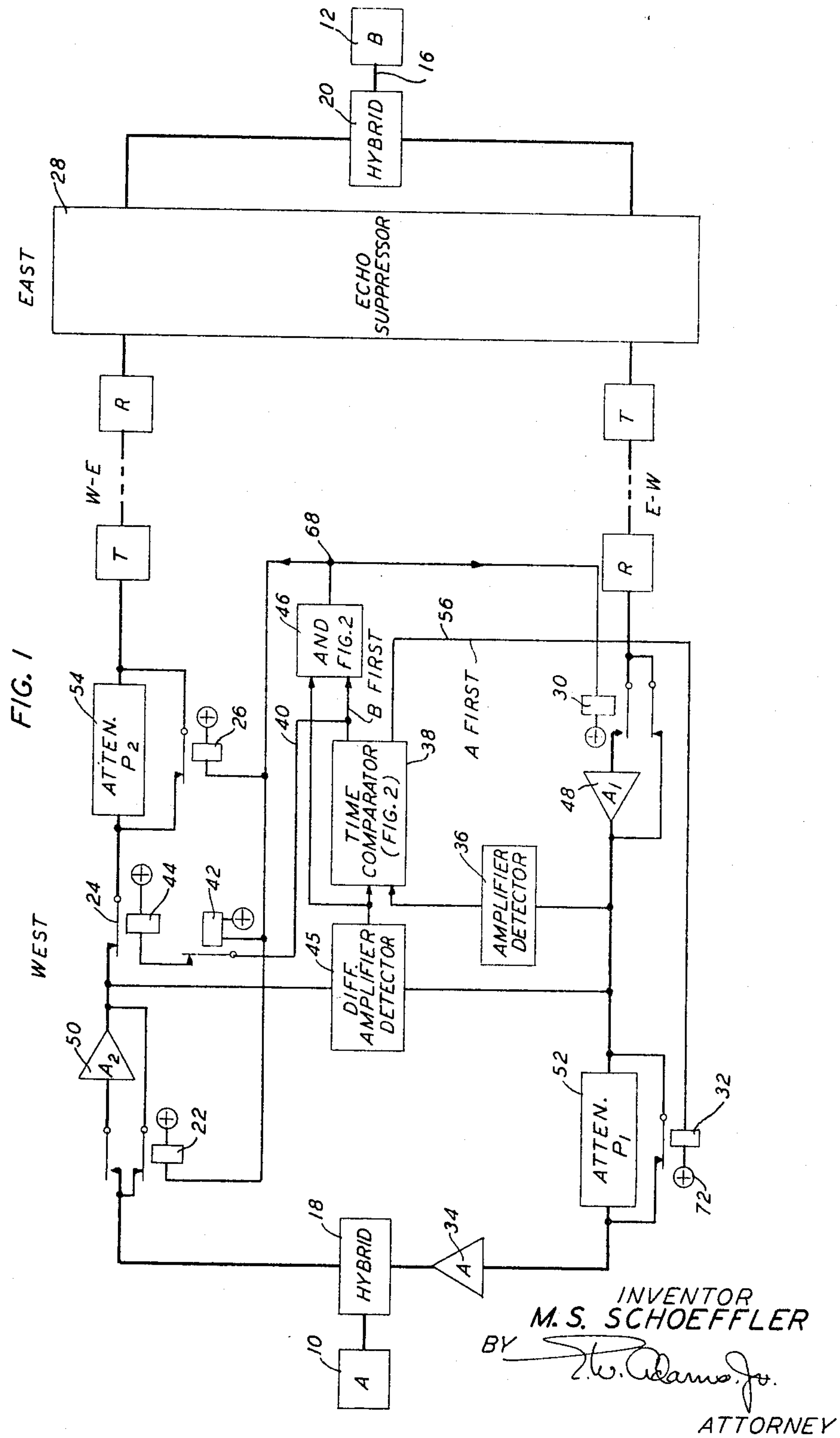

This invention relates to echo suppressors, and, more particularly, to echo suppressors arranged to minimize the problems, such as double talking and speech blocking, which occur when echo suppressors are utilized in communication systems having extended time delays.

It is well known when local telephone or similar two-way, two-wire circuits are interconnected by transmission facilities, such as paired one-way radio or carrier links, the possibility of the generation of echoes in the over-all circuit is always present. Echoes occur because the means, usually a hybrid circuit, connecting the two one-way transmission channels extending between the terminals of a communication link with the two-way local circuits at the terminals cannot be made perfect and permits a certain amount of transmission between the incoming and outgoing one-way transmission channels. Thus, although the principal portion of the speech signals received at a terminal is properly transmitted by the hybrid network to the local two-wire circuit at that terminal, a significant portion of such speech signals traverses the hybrid and is returned over the other one-way transmission facilities to the originating speaker's terminal. This portion of the originating speaker's speech signal is, of course, indistinguishable, insofar as a hybrid network at his terminal is concerned, from desired incoming speech from the other speaker and, accordingly, is returned to the originating speaker to be heard by him as echo.

When the transmission delay is sufficient, such echoes have proved annoying and numerous echo suppressor arrangements have been proposed to interrupt the echo path in an appropriate manner to prevent or suppress the reception of echoes by a subscriber who is attempting to speak over the facilities.

As a further refinement in dealing with echoes, provision has been made to permit a more or less normal conversation to proceed by inhibiting the suppressor action whenever it is determined that both parties are attempting simultaneously to communicate over the facilities. This condition, known as double talking, occurs frequently in normal conversation, but, of course, is impossible if one of the two one-way transmitting paths is blocked to suppress echoes as soon as a speaker seizes the communication facilities. Accordingly, provisions have been made in the past for modifying the action of echo suppressors to permit at least low level two-way transmission between the terminals so that the cues, which normally control a conversation between two persons may be perceived. This solution, in its more sophisticated forms, has performed quite satisfactorily in communication circuits for many years. With the advent of satellite communication systems and other systems in which extremely long transmission links may be involved, however, round-trip transmission delays between terminals of the order of 500 or 600 milliseconds are experienced and the presence of such extended delays has made the usual echo suppressor and double-talking circuit arrangements rather ineffective.

The problem to which the present invention is addressed may be emphasized by a consideration of the events which may occur when two persons attempt to communicate over a communication channel including a conventional echo suppressor and subject to extended transmission delays. Obviously, there is no particular difficulty when only one party desires to talk at a time. As speech is transmitted with the delay, the echo suppressor at the other end of the circuit opens the return channel in the usual manner to prevent the receipt of echoes by the originating speaker. Assume, however, that a pause occurs in the normal course of the first speaker's conversation. Such a pause normally suggests to the other party to the conversation that he may now interrupt or interject a comment. Consider, however, the effect of an extended time delay. When the first speaker pauses, 300 milliseconds expire before the second party to the conversation perceives that he may now interrupt. Assuming the normal operation of an echo suppressor, the suppression inserted at the far end terminal to prevent the return of echo to the first speaker will be removed at about the time that the second party perceives the pause and attempts to make his return comment. Meanwhile, the first party has resumed his conversation since he has heard no reply or interruption from the other party. This is quite understandable because due to the round-trip delay of about 600 milliseconds, the other party has not had time to perceive the pause and make a comment which will be heard by the first speaker in time. However, when the speech of the second party is finally received at the terminal of the first speaker, the echo suppressor at that location detects double talking, and, in the usual case, inserts sufficient loss in both channels so that the two parties can hear, or at least perceive, the condition in which both are attempting to speak. At the same time, the party at the far end of the circuit having attempted to speak, but not having succeeded in interrupting the originating speaker, also perceives the double-talking condition. The effect of these circumstances is disruption of the conversation. Neither party is in control of the interchange and one or the other will of course, after a sufficient pause, attempt to reinitiate the conversation. The course of events, just outlined, will probably repeat and the conversation will again be blocked. Further, if attenuation is inserted to account for double talking, the speech signals of a weak speaker may be so attenuated that the other party believes the first is listening when, in fact, he is still speaking.

In view of the above, it is an object of the invention to arrange a communication system having both two-wire and four-wire portions and subject to a long time delay in transmission to permit normal conversations and, at the same time, to alleviate the production of echoes.

In accordance with the above object, there is provided an echo suppressor system which acts at each terminal to interrupt transmission to the other terminal whenever it is detected that the party at the far terminal alone is speaking. Further provision is made for determining which party was the first to speak whenever double talking occurs and the result of this determination is utilized to insert a substantial amount of gain in the transmission path from the terminal of the party who was first to speak so that the other party is effectively "shouted down" whenever he attempts to interrupt. Thus, the party who attempts to interrupt knows the other is not listening and that he must wait until the other is, in fact, not speaking (no "shout down") before he continues.

Figure 2:
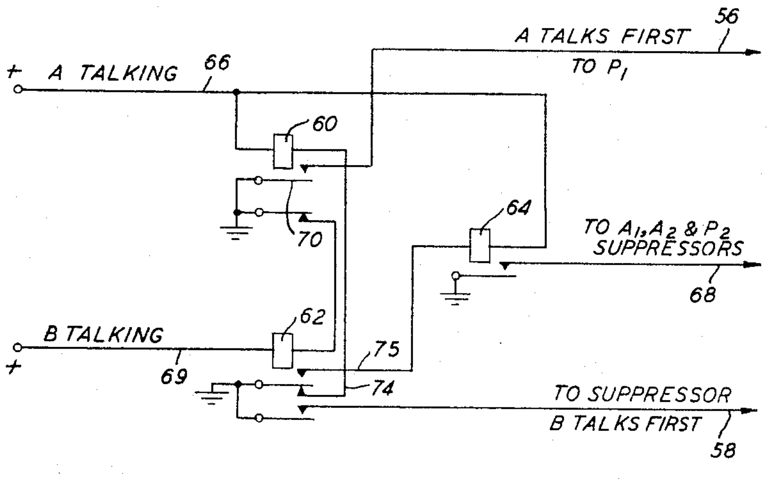

The above and other features of the invention will be considered in the following detailed specification, taken in conjunction with the accompanying drawings, in which:

FIG. 1 is a block diagram of a communication system, including an echo suppressor arranged in accordance with the arrangement, and FIG. 2 is a schematic diagram illustrating details of the time comparator and the AND circuit shown in the block diagram of FIG. 1.

As shown in FIG. 1 of the drawing, the invention is embodied in a telephone system in which two subscribers, A and B, whose local telephone equipment indicated generally at blocks 10 and 12, respectively, are interconnected by way of conventional two-wire circuits, and hybrid networks 18 and 20, respectively, to the terminals of a transmission facility involving two one-way two-wire circuits each of which may, for example, comprise a radio transmission link having a transmitter at one terminal and a receiver at the other. Such facilities are shown only schematically and the transmission paths are indicated by the heavy single lines of the diagram, the transmitter and receiver being indicated symbolically by the letters T and R at the terminals of the transmission paths, indicated by the dashed line portions of the diagram.

For convenience of description, the terminal associated with party A's local circuit may be referred to hereinafter as the West terminal and that associated with the party B as the East terminal. The parties A and B will be referred to simply as "A" and "B" and the transmission paths from A to B and from B to A will be referred to as the W–E and the E–W paths, respectively.

The echo suppressor of the invention is shown in FIG. 1 in the form of a split terminal echo suppressor wherein identical suppressor circuitry is located at the two terminals of the transmission link. The details of the echo suppressor for the West terminal to which speaker A is connected are shown in the drawing and will be discussed hereinafter. It will be understood that the large circuit block 28 shown at the East terminal includes elements identical to those to be described in connection with the West terminal, those elements associated with the W–E channel at the West terminal are associated with the E–W channel at the far end or East terminal. Similarly, those elements associated with the E–W branch at the West terminal are associated with the W–E branch at the East terminal.

At the West terminal of the system, the echo suppressor circuitry includes a number of elements which may be selectively and appropriately inserted in or removed from the two transmission paths by means of relay switches acting under the control of certain auxiliary circuitry. It will be understood, of course, that solid state switches, utilizing either transistors or solid state diodes, may be equally well employed and that the attenuators, amplifiers and similar elements are shown schematically in the drawing to facilitate easy understanding of the essential features of the invention.

The transmission path from speaker A extends from his local equipment 10 over a two-wire, two-way transmission path to hybrid network 18, thence his talking path extends through the normally closed contacts of a relay 22 to the normally closed suppression switch 24. After traversing this switch, speech currents originated by A traverse the normally closed contact of a relay 26 thus reaching transmitter T for transmission to receiver R in the W–E branch of the transmission facility and thus, ultimately, through hybrid 20 and two-wire circuit 16 to local equipment 12, at which it is heard by B. In similar fashion, speech signals from B, in the absence of any speech by A, travel by way of hybrid 20, transmitter T and receiver R in the E–W branch of the transmission facilities, the normally closed contact of relay 30 and normally closed contact of relay 32 to isolation amplifier 34, the output which supplies the incoming speech signal to hybrid terminal at 18 for transmission through the local circuit to A's terminal equipment 10.

In order to prevent the return of echo to the speaker who originated the conversation, the usual echo suppressor arrangement is provided. This may be best understood by a consideration of the arrangement at the West terminal to prevent the return of echo to the East terminal when B is the only speaker attempting to converse over the facilities. B's speech travels over the path just indicated, and is perceived by A at local equipment 10. B's speech, however, is also detected in an amplifier-detector 36, which may comprise a conventional amplifier and a simple diode rectifier and provides an indication in the form of a direct-current voltage that speech has been received from the other terminal of the system. This information is utilized in time comparator 38, in a manner to be described in detail hereinafter, to provide an output on lead 40 which output is applied through the normally closed contacts of relay 42 to the winding of relay 44. Energization of this relay winding opens suppression switch 24 in the transmission path extending from hybrid 18 to transmitter T in the W–E branch of the communication facility. Thus, speech signals received from B and transmitted through hybrid 18 are prevented from reaching the transmitter in the W–E branch of the transmission facilities and it cannot be returned to B, there to appear as echoes. It will be understood, of course, that by virtue of provision of identical facilities in echo suppressor 28 at the East terminal, A is spared the annoyance of echo from his own speech so long as he alone is attempting to utilize the communication facility.

The arrangements provided according to the invention to prevent double talking, and the attendant disruption of conversation resulting from the loss of conversational cues in the extended time delay of the transmission facilities may now be considered. Each of the split terminal echo suppressors includes means effective whenever double talking is detected for determining which of the two speakers interrupted the other. Whenever a determination is made that the speaker at the terminal involved has attempted to interrupt the speaker at the far end terminal, an amplifier is inserted in the talking path extending from the far end terminal so that the interrupting speaker at the near end terminal is effectively "shouted down" by the speaker whom he attempted to interrupt and is quickly notified that his interruption was not welcomed and should be discontinued. Apparatus for this purpose is indicated in the schematic diagram in the left-hand portion of the block diagram of FIG. 1 and includes, in addition to those elements already discussed, a differential amplifier-detector circuit 45, an AND gate or circuit 46, amplifiers 48 and 50 and attenuators 52 and 54. The functions of these additional circuit elements will be considered in terms of operation of the echo suppressor when double talking occurs.

Let it be assumed that B has initiated a conversation and continues to talk. A is silent and B's speech signals travel in the lower or E–W branch of the transmission facility by way of the normally closed contacts of relays 30 and 32, and isolation amplifier 34 to hybrid 18 there to be diverted over local circuit 14 to local equipment 10, where they are heard by A. At the same time, the amplifier-detector 36 acts, as indicated above, to open suppression switch 24 in the upper or W–E branch of the transmission facility to prevent the return of echoes to party B. If, under these circumstances, B hesitates or pauses in his speech without, however, intending to invite a reply by A, the extended time delay of the transmission facility conveys the fact that this pause has occurred to A after such an interval that party B may well have reinstituted his speech before A is aware that the pause occurred. Party A, however, now perceiving the pause may well attempt to reply. If he does so, the fact that he, too, is speaking will be perceived by amplifier-detector 45 which has inputs both from the upper and lower branches of the transmission facilities at the West terminal of the system. Conveniently, amplifier-detector 45 includes two detectors, one for signals from the receiver of the E–W channel from B, and one for signals from A in the W–E channel. Each of these detectors produces an output and these outputs are weighted so that speech or signals from the W–E channel must always exceed those received from the E–W channel before operative control signals are produced. The signals from the E–W channel are processed and serve as a reference against which signals from the W–E channel are compared. Because of the presence of hybrid 18 any signal from the E–W channel will reach the W–E channel only after substantial attenuation. As a result, only when A speaks will the signal in the W–E channel exceed the reference from the E–W channel. It follows that when A speaks, detector 45 will produce an output whether or not B is also speaking. On the other hand, echo from B's speech or incoming noise from the E–W channel cannot produce an output from the detector. Thus, only when A and B speak simultaneously are outputs available from both amplifier-detector 36 and amplifier-detector 45. The outputs from the two detectors are applied to a time comparator 38, the details of which will be considered hereinafter in connection with FIG. 2 of the drawing. The output of amplifier-detector 45, which indicates whether or not A is talking, is also applied to AND gate 46. Time comparator 38 includes circuitry which provides either of two outputs, depending upon whether A was the first to speak at the time double talking was initiated, or B was the first to speak. Assuming that A is judged by time comparator 38 to be the first to speak, an output appears on lead 56 for application to the winding of relay 32. If, on the other hand, B was the first to speak, an output is produced on lead 58 for application to an input of AND circuit 46, and by way of the normally closed contacts of relay 42 to relay 44. It wil be understood that the output applied to relay 44, if B is the first to speak, corresponds to the control normally employed in an echo suppressor for opening the W–E channel to suppress the return of echoes which would otherwise reach B at the E terminal.

If double talking is indicated under the circumstances in which B was the first to speak, two outputs reach AND circuit 46, one from time comparator 38, indicating that B was first to speak, and one from amplifier-detector 45, indicating that A has attempted to interrupt B. The coincidence of inputs at AND circuit 46 produces an output on lead 68 which is applied to the windings of relays 22, 26, 30, and 42 in parallel. The operation of these relays serves to make appropriate changes in the elements of the talking paths to the end that A is effectively "shouted down" whenever he attempts to interrupt B. The details of such changes will be considered below following a brief discussion of the circuit arrangements of time comparator 38 and AND circuit 46, as shown in FIG. 2 of the drawing.

In FIG. 2 of the drawing, both time comparator 38 and AND circuit 46 are included in a relatively simple embodiment involving three relays 60, 62, and 64. An input lead 66 corresponds to the lead connecting amplifier-detector 45 to time comparator 38 in FIG. 1 of the drawing and is indicated as having a positive voltage present thereon when A is talking. A similar lead 69 corresponds to the lead connecting amplifier-detector 36 to time comparator 38 and carries a positive potential when B is talking. A positive potential appearing on lead 66 traverses the winding of relay 60 and reaches ground by way of the normally closed contact 74 of relay 62. A positive potential applied to lead 69 traverses the winding of relay 62 and reaches ground by way of the normally closed contact of relay 70. The contacts of relays 60 and 62 are shown in FIG. 2 in the normal condition in which neither party is talking. If A's speech is detected in the absence of any speech from B, the winding of relay 60 is energized and a circuit is completed between ground and output lead 56 by way of the normally open contact of relay 60. The connection of a ground to lead 56 indicates that A was the first to talk, and, as indicated in FIG. 1 of the drawing, will permit current to flow from battery 72 through the winding of relay 32. At the same time, the operating path to ground for relay 62 is opened, thus preventing subsequent operation of this relay.

If B is first to talk, relay 62 is operated and a ground is applied to lead 58 permitting the operation of the various relays connected to this lead, as will be considered hereinafter. It will be noted that operation of relay 62 completes a circuit by way of contact 75 between lead 66 and ground by way of the winding of relay 64. This provides the AND function of AND gate 46 of FIG. 1 of the drawing, inasmuch as, when both A and B are talking in the B-talked-first mode, relay 64 is energized and applies a ground to lead 68, permitting the operation of the various relays connected thereto, as will be considered further in connection with FIG. 1 of the drawing.

The operation of the echo suppressor, shown in FIG. 1, may now be considered for the various conditions involving double talking. If A alone talks, the output of time comparator 38 appearing on lead 56 causes relay 32 to operate, opening its normally closed contact and inserting attenuator 52 in the return path. This attenuator serves to reduce the level of noise and/or echoes returning to terminal 10 from the far end of the system.

It will be recalled that if B alone speaks, an output on lead 40 is effective to operate relay 44, thus opening the contact 24 and blocking the transmission of speech and echoes from A to B. In all other respects, the circuit remains in the condition shown in FIG. 1.

If, now, A attempts to interrupt when B is already speaking, two inputs are available at AND gate 46 and an output appears on lead 68. This output causes the operation of several relays shown in FIG. 1. Thus, relay 42 is energized to interrupt the operating circuit of relay 44. This removes the echo suppression afforded by switch 24 and permits A's speech to travel toward terminal B. This is necessary in the event that B indeed invites and then waits for a reply from A. The appearance of an input on lead 68 also operates relay 30 to substitute a path through amplifier 48 for the normal path bypassing that amplifier. At the same time, relay 22 is operated to substitute a substantially identical amplifier 50 in the path extending from A toward the transmitter in the W–E branch and attenuator 54 is placed in that branch through the operation of relay 26. Thus, if A attempts to interrupt B, B's speech signals, amplified by a predetermined amount in amplifier 48, are applied by way of isolation amplifier 34 and hybrid 18 to terminal 10, thus easily convincing A that his attempt to interrupt or reply has not been welcomed. Amplifier 50, inserted in the return path at the same time, is necessary to maintain a practicable level of effective return loss in hybrid 18. The amplification so provided is negated, however, insofar as transmission of signals from hybrid 18 to the far end terminal by the action of attenuator 54, which is inserted in that path at the same time.

Conveniently, the relays 60 and 62 of FIG. 2, constituting the operative elements of time comparator 38, are arranged to have significant hangover or release times to prevent speech chopping in the event that the speech signals of the two parties are interrupted momentarily. Further, the hangover of relay 62, which indicates that B, the far end subscriber, was the first to talk, is made slightly longer than that of relay 60, the operation of which indicates that subscriber A was the first to speak. Accordingly, the far end party is favored with control of the circuit in the event that double talking or other circumstances causes both parties to cease conversation at the same time.

It will be understood that in the event that party A is the first to speak, an attempted interruption by party B will receive the same treatment at the far end (East) terminal, as has been outlined above for interruption for the party A at the near end (West) terminal when party B was the first to speak. Thus, in the over-all operation of the system, the person who was first to speak when double talking occurs "shouts down" the other person by virtue of amplification inserted in the talking path incoming to the terminal of the first to speak. As a result, the double talking and speech blocking which otherwise would be encountered when the transmission facilities include a long time delay are effectively eliminated, since the interrupting party is readily discouraged from attempting continued interruption when his first attempt is met with an increase in the talking level of the interrupted party.

What is claimed is:

1. In a communication system having first and second terminals each including a two-wire terminal branch and two one-way transmission branches interconnecting said terminals to provide two-way communication between said terminal branches, echo suppression means arranged to permit communication between said terminal branches despite extended transmission delays comprising a split terminal echo suppressor, means at each terminal for detecting the initiation of speech signals at that terminal while speech signals are being received at that terminal from the other terminal, and means responsive to the detection of this condition for substantially increasing the level of the signals received from the other terminal.

2. In a communication system having first and second terminals each including a two-wire terminal branch and two one-way transmission branches interconnecting said terminals to provide two-way communication between said terminal branches, a split terminal echo suppressor including at each terminal means responsive to speech signals received from the other terminal for suppressing the transmission of speech signals to said other terminal, means for detecting interrupting speech destined for said other terminal, an amplifier for speech signals, and means responsive to said detecting means for negating the effect of said suppressing means upon the path to said other terminal and inserting said amplifier in the path incoming from said other terminal.

3. In a communication system having first and second terminals each including a two-wire terminal branch and two one-way transmission branches interconnecting said terminals to provide two-way communication between said terminal branches, a split terminal echo suppressor including at each terminal means responsive to speech signals incoming from the other terminal for suppressing the transmission of speech signals to said other terminal, means for detecting double talking effective only when double talking results from the origination of speech signals after speech signals have been received from the other terminal, amplifier means, means responsive to said means for detecting double talking for blocking the action of said suppressing means and for inserting said amplifier in the path of speech signals originating at said other terminal.

4. In a communication system having first and second terminals each including a two-wire terminal branch and two one-way transmission branches interconnecting said terminal to provide two-way communication between said terminal branches, and echo suppressor means to permit communication over said channel despite extended transmission delays comprising a split terminal echo suppressor means at each terminal for detecting the initiation of speech signals at that terminal during the receipt of speech signals from the other terminal, first and second amplifier means and attenuator means introducing a loss equal to the amplification of said second amplifier means and means responsive to said detecting means for inserting said first amplifier means in the path of speech signals from said other terminal, inserting said second amplifier means in the path of speech to said other terminal and inserting said attenuator means in said path to said other terminal.

5. In a communication system having first and second terminals each including a two-wire terminal branch and two one-way transmission branches interconnecting said terminal to provide two-way communication between said terminal branches, a split terminal echo suppressor included at each terminal, means for detecting speech originating at that terminal and producing a first control signal, means for detecting speech received from the other terminal and producing a second control signal, means for accepting said control signals and producing a first output when said first control signal is the first received, a second output when said second control signal is the first received and a third when said first control signal is received if said second output has been produced and continues, means responsive to said first output for attenuating signals in the path from said other terminal, means responsive to said second output for effectively suppressing signals in the path to said other terminal, and means responsive to said third output for removing said suppression and increasing the level of signals in the path from the other terminal.

6. In a communication system having first and second terminals each including a two-wire terminal branch and two one-way transmission branches interconnecting said terminal to provide two-way communication between said terminal branches, a split terminal echo suppressor included at each terminal, means for detecting speech originating at that terminal and producing a first control signal, means for detecting speech received from the other terminal and producing a second control signal, means for accepting said control signals and producing a first output when said first control signal is the first received, a second output when said second control signal is the first received and a third when said first control signal is received if said second output has been produced and continues, means responsive to said first output for attenuating signals in the path from said other terminal, means responsive to said second output for effectively suppressing signals in the path to said other terminal, and means responsive to said third output for removing said suppression and increasing the level of signals in the path from the other terminal, said last means remaining operative for a predetermined time after the cessation of said control signals.

References Cited by the Examiner

UNITED STATES PATENTS

| | | | |
|---|---|---|---|
| 2,251,028 | 7/1941 | Barney | 179—170.2 |
| 2,258,966 | 10/1941 | Bjornson | 179—170.2 |
| 2,281,912 | 5/1942 | Bjornson | 179—170.2 |

KATHLEEN H. CLAFFY, *Primary Examiner.*

H. ZELLER, *Assistant Examiner.*